United States Patent
Oh et al.

(10) Patent No.: US 10,001,554 B2
(45) Date of Patent: Jun. 19, 2018

(54) RADAR SIGNAL PROCESSING METHOD AND APPARATUS

(71) Applicant: DAEGU GYEONGBUK INSTITUTE OF SCIENCE AND TECHNOLOGY, Daegu (KR)

(72) Inventors: Dae Gun Oh, Daegu (KR); Jong Hun Lee, Daegu (KR)

(73) Assignee: DAEGU GYEONGBUK INSTITUTE OF SCIENCE AND TECHNOLOGY, Daegu (KR)

(*) Notice: Subject to any disclaimer, the term of this patent is extended or adjusted under 35 U.S.C. 154(b) by 291 days.

(21) Appl. No.: 14/822,719

(22) Filed: Aug. 10, 2015

(65) Prior Publication Data
US 2016/0047910 A1    Feb. 18, 2016

(30) Foreign Application Priority Data
Aug. 12, 2014  (KR) .................. 10-2014-0104617

(51) Int. Cl.
*G01S 13/08*    (2006.01)
*G01S 7/35*     (2006.01)
*G01S 13/34*    (2006.01)

(52) U.S. Cl.
CPC ............. *G01S 13/08* (2013.01); *G01S 7/354* (2013.01); *G01S 13/343* (2013.01)

(58) Field of Classification Search
CPC ................ G01S 13/343; G01S 7/354; G01S 13/08–13/40
USPC ......................................................... 342/146
See application file for complete search history.

(56) References Cited

U.S. PATENT DOCUMENTS

2015/0198697 A1* 7/2015 Kishigami ........... G01S 7/2923
                                                        342/145

FOREIGN PATENT DOCUMENTS

JP           2010-071958 A     4/2010

* cited by examiner

*Primary Examiner* — Matthew M Barker
(74) *Attorney, Agent, or Firm* — McDermott Will & Emery LLP

(57) ABSTRACT

Provided is a radar signal processing method and apparatus, the method including transmitting a plurality of transmission radar signals through a transmission antenna, receiving a reception radar signal reflected from a target in response to the transmitting, and extracting location information on the target based on a result obtained by applying an auto-correlation to the reception radar signal.

8 Claims, 4 Drawing Sheets

RADAR SIGNAL PROCESSING METHOD AND APPARATUS

CROSS-REFERENCE TO RELATED APPLICATION

This application claims the priority benefit of Korean Patent Application No. 10-2014-0104617, filed on Aug. 12, 2014, in the Korean Intellectual Property Office, the disclosure of which is incorporated herein by reference.

BACKGROUND

1. Field of the Invention

Example embodiments of the present invention relate to a method of processing a radar signal having an extendable maximum detection distance and an apparatus for performing the method.

2. Description of the Related Art

A radar signal processing apparatus may be an apparatus for transmitting a radar signal through a transmission antenna and receiving a reflection signal reflected from an object in a corresponding area through a reception antenna, thereby detecting a presence of a target and a distance from the target. In this example, the radar signal may be modulated based on, for example, a pulse scheme, a frequency modulated continuous wave (FMCW) scheme, and a frequency shift keying (FSK) scheme. The radar may use a different method of extracting a speed of the target and the distance from the target based on a modulation scheme.

As an example, in contrast to a pulse scheme-based radar, an FMCW-based radar signal processing apparatus may transmit a radar signal modulated based on the FMCW scheme to a target. Thus, the FMCW-based radar signal processing apparatus may receive a reflection signal reflected from the target, thereby extracting a speed of the target and a distance from the target.

The FMCW-based radar signal processing apparatus may be advantageous in terms of having a simple structure and a miniaturized size. Accordingly, the FMCW-based radar signal processing apparatus may be applied to a small scale radar for military purposes, a radar for altitude measurement purposes, and a vehicle collision preventing system.

In general, the FMCW-based radar signal processing apparatus may arrange a frequency of a radar signal to be transmitted to a target such that the frequency is linearly changed over time. Through this, the FMCW-based radar signal processing apparatus may extract a location of the target based on a frequency of a signal reflected from the target.

SUMMARY

According to an aspect of the present invention, there is provided a radar signal processing method including transmitting a plurality of transmission radar signals through a transmission antenna, receiving a reception radar signal reflected from a target in response to the transmitting, and extracting location information on the target based on a result obtained by applying an auto-correlation to the reception radar signal.

The extracting may include verifying an arrival time of the reception radar signal based on the result obtained by applying the auto-correlation to the reception radar signal, and determining an index of a transmission radar signal based on the verified arrival time.

The extracting may include verifying an arrival time of the reception radar signal based on the result obtained by applying the auto-correlation, and calculating a large scale range based on an index of a transmission radar signal determined based on the verified arrival time.

The extracting may include verifying an arrival time of the reception radar signal based on the result obtained by applying the auto-correlation, and calculating a small scale range based on a beat frequency between a transmission radar signal and a reception radar signal at the verified arrival time.

The extracting may include verifying an arrival time of the reception radar signal based on the result obtained by applying the auto-correlation, and extracting the location information on the target using a large scale range calculated based on an index of a transmission radar signal determined at the verified arrival time and a small scale range calculated based on a beat frequency between a transmission radar signal and a reception radar signal corresponding to the verified arrival time.

The transmission radar signals and the reception radar signal may be modulated based on a frequency modulated continuous wave (FMCW) scheme.

According to another aspect of the present invention, there is also provided a radar signal processing apparatus including a transmitter configured to transmit a plurality of transmission radar signals through a transmission antenna, a receiver configured to receive a reception radar signal reflected from a target in response to the transmitting, and an extractor configured to extract location information on the target based on a result obtained by applying an auto-correlation to the reception radar signal.

The extractor may be configured to verify an arrival time of the reception radar signal based on the result obtained by applying the auto-correlation to the reception radar signal, and determine an index of a transmission radar signal based on the verified arrival time.

The extractor may be configured to verify an arrival time of the reception radar signal based on the result obtained by applying the auto-correlation, and calculate a large scale range based on an index of a transmission radar signal determined based on the verified arrival time.

The extractor may be configured to verify an arrival time of the reception radar signal based on the result obtained by applying the auto-correlation, and calculate a small scale range based on a beat frequency between a transmission radar signal and a reception radar signal at the verified arrival time.

The extractor may be configured to verify an arrival time of the reception radar signal based on the result obtained by applying the auto-correlation, and extract the location information on the target using a large scale range calculated based on an index of a transmission radar signal determined at the verified arrival time and a small scale range calculated based on a beat frequency between a transmission radar signal and a reception radar signal corresponding to the verified arrival time.

The transmission radar signals and the reception radar signal may be modulated based on an FMCW scheme.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
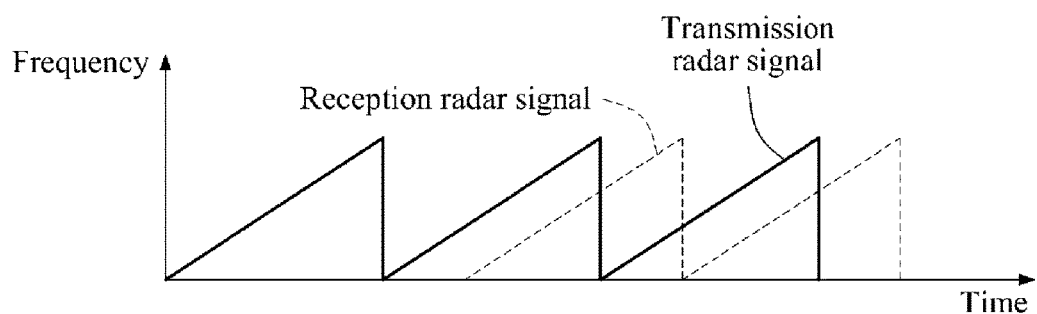
FIG. 1 is a diagram illustrating a radar signal processing apparatus having an extendable maximum detection distance according to an example embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a radar signal processing apparatus may refer to, for example, an apparatus for transmitting a transmission radar signal through a transmission antenna by generating the transmission radar signal, and receiving a reception radar signal through a reception antenna. Also, the transmission radar signal may refer to, for example, a signal generated using a voltage control oscillator of the radar signal processing apparatus.

As an example, through the transmission antenna, the radar signal processing apparatus may transmit the transmission radar signal modulated based on a modulation scheme, for example, a pulse scheme, a frequency modulated continuous wave (FMCW) scheme, and a frequency shift keying scheme. Also, the radar signal processing apparatus may receive the reception radar signal through the reception antenna.

The radar signal processing apparatus may receive a plurality of reception radar signals reflected from a plurality of targets through a plurality of reception antennas for each channel. The radar signal processing apparatus may mix the reception radar signal and the transmission radar signal using a mixer.

The radar signal processing apparatus may mix the reception radar signal and the transmission radar signal by using the mixer for each channel. Hereinafter, the radar signal may refer to, for example, a signal obtained by mixing the reception radar signal and the transmission radar signal.

Hereinafter, the FMCW scheme may refer to, for example, a modulation scheme of arranging a frequency to be linearly changed over time. The radar signal obtained by mixing the transmission radar signal and the reception radar signal may have a constant frequency band. Thus, the radar signal processing apparatus may extract a distance between the target and the reception antenna based on a frequency of the radar signal. However, in the present disclosure, a type of the modulation scheme is not be limited to the foregoing and thus, the distance between the target and the reception antenna may be extracted from a radar signal modulated based on various modulation schemes.

In an example, the radar signal processing apparatus may estimate a beat frequency from the radar signal. The beat frequency may indicate a difference in a frequency between two signals. As an example, the transmission radar signal and the reception radar signal is modulated based on the FMCW scheme, the frequency of the radar signal may correspond to a difference in a frequency between the transmission radar signal and the reception radar signal. Thus, the radar signal processing apparatus may sense the target based on the beat frequency.

Accordingly, a maximum detection distance of the radar signal processing apparatus may be determined based on a period of the transmission radar signal. In general, the maximum detection distance may be expressed as shown in Equation 1. In Equation 1, C denotes a velocity of light, for example, $3*10^8$ m/s. Also, T denotes the period of the transmission radar signal.

$$\frac{T}{4} \times C \qquad \text{[Equation 1]}$$

Accordingly, to increase the maximum detection distance, the radar signal processing apparatus may need to increase the period of the transmission radar signal. When the period of the transmission radar signal increases in a predetermined bandwidth, the transmission radar signal may be changed to a form of a slow chirp and a gradient may decrease, which may lead to a degradation in a target detection accuracy. Through thus, an efficiency in the radar signal processing apparatus may also decrease.

To solve an issue of the maximum detection distance restricted based on the period of the transmission radar signal, the radar signal processing apparatus may consecutively transmit a plurality of transmission radar signals through a transmission antenna. In an example, as illustrated in FIG. 1, the radar signal processing apparatus may consecutively transmit the transmission radar signal modulated based on the FMSW scheme. In this example, the radar signal processing apparatus may assign an index for each of the transmission radar signals. The index may include information associated with the transmission radar signal. As an example, the index may include information associated with a transmission order of the transmission radar signals. The radar signal processing apparatus may store the index in a memory.

When the transmission radar signal is consecutively transmitted, the radar signal processing apparatus may consecutively receive a plurality of reception radar signals reflected from the target through the reception antenna. The radar signal processing apparatus may obtain a peak value by applying an auto-correlation to a radar signal corresponding to two consecutive period among radar signals acquirable for each period of the transmission radar signal so as to verify a point at which a reception radar signal arrives. Based on the obtained peak value, the radar signal processing apparatus may verify a transmission radar signal transmitted at an arrival time of the reception radar signal, thereby calculating a large scale range. For example, the radar signal processing apparatus may accurately identify the transmission radar signal transmitted at the arrival time of the reception radar signal by using the index stored in the memory.

In an example, as illustrated in FIG. 1, the radar signal processing apparatus may verify that the reception radar signal arrives during a process of transmitting a second transmission radar signal based on a result obtained by applying the auto-correlation to a radar signal corresponding to two consecutive period among radar signals acquirable for each period of the transmission radar signal. In this example, the radar signal processing apparatus may accurately identify an ordinal position of the transmission radar signal by using the index stored in the memory.

The radar signal processing apparatus may estimate the beat frequency based on the radar signal obtained by mixing the reception radar signal and the transmission radar signal. Through this, the radar signal processing apparatus may calculate a small scale range based on the beat frequency.

In an example, as illustrated in FIG. 1, the radar signal processing apparatus may estimate the beat frequency based on a radar signal obtained by mixing the reception radar signal and the second transmission radar signal. Through this, the radar signal processing apparatus may calculate the small scale range by applying a frequency tracking algorithm to the beat frequency.

The radar signal processing apparatus may determine a distance between the target and the reception antenna based on the small scale range and the large scale range. Through this, the radar signal processing apparatus may extract location information on the target.

In this example, to extract the location information on the target, the radar signal processing apparatus may determine the small scale range and the large scale range based on the arrival time of the reception radar signal. For example, when the reception radar signal reflected from the target arrives before half of the period of the transmission radar signal elapses, the distance between the target and the reception antenna may be determined by calculating the small scale range. Also, when the reception radar signal reflected from the target arrives after half of the period of the transmission radar signal elapses, the distance between the target and the reception antenna may be determined by calculating the large scale range.

Hereinafter, a radar signal processing method performed by the radar signal processing apparatus will be explained in detail with reference to the following descriptions.

Figure 2:
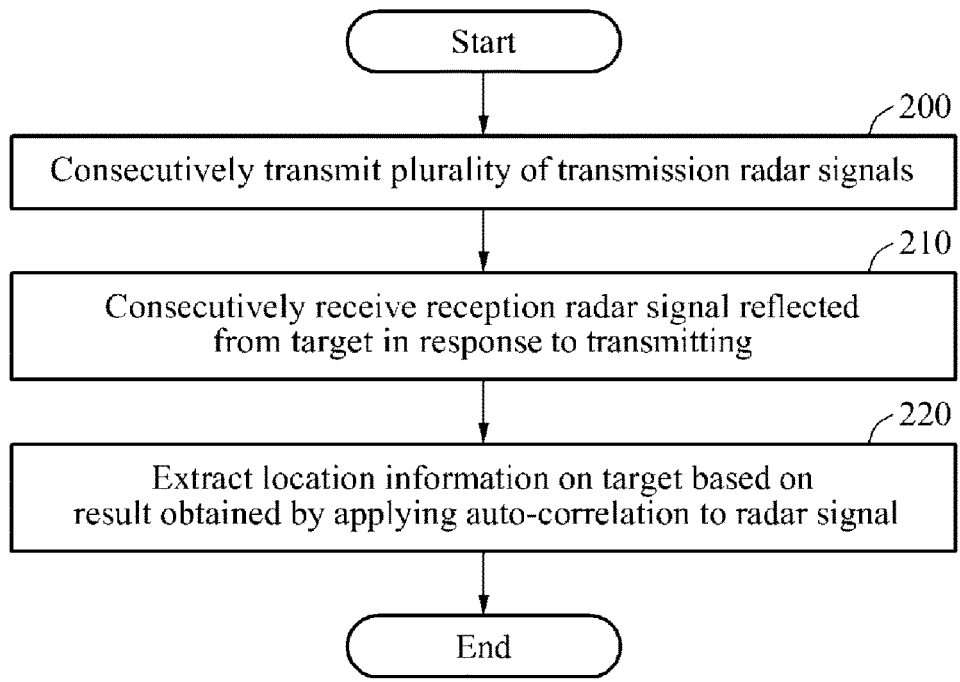
FIG. 2 is a flowchart illustrating a radar signal processing method of extracting a location of a target based on an index of a transmission radar signal and a result obtained by applying an auto-correlation to a radar signal according to an example embodiment of the present invention.

FIG. 2 is a flowchart illustrating a radar signal processing method of extracting a location of a target based on an index of a transmission radar signal and a result obtained by applying an auto-correlation to a radar signal according to an example embodiment of the present invention.

In operation 200, a radar signal processing apparatus may transmit a plurality of transmission radar signals through a transmission antenna. In an example, the radar signal processing apparatus may consecutively transmit at least one transmission radar signal through the transmission antenna. The radar signal processing apparatus may control a voltage control oscillator to generate the plurality of transmission radar signals. Thus, the radar signal processing apparatus may consecutively transmit the plurality of transmission radar signals through the transmission antenna.

In operation 210, the radar signal processing apparatus may consecutively receive a reception radar signal through a reception antenna. In an example, a transmission antenna may be reflected from a target. Thus, the radar signal processing apparatus may receive at least one concatenating reception radar signal reflected from the plurality of targets through a plurality of reception antennas.

In operation 220, the radar signal processing apparatus may obtain a peak value by applying an auto-correlation to a radar signal corresponding to two consecutive periods among radar signals acquirable for each period of the transmission radar signal, thereby verifying a time at which the reception radar signal arrives. Based on the obtained peak value, the radar signal processing apparatus may verify a transmission radar signal transmitted at an arrival time of the reception radar signal, thereby calculating a large scale range.

The auto-correlation may refer to, for example, a relationship between previous data and current data. The radar signal processing apparatus may verify a correlation between the transmission radar signal corresponding to the previous data and the reception radar signal corresponding to the current data, thereby verifying the arrival time. In this example, the reception radar signal may be generated based on the transmission radar signal reflected and received from the target.

In an example, the radar signal processing apparatus may assign an index to the transmission radar signal. The index may refer to, for example, information associated with a transmission order of the transmission radar signal. The radar signal processing apparatus may identify consecutively transmitted transmission radar signals based on the index.

The radar signal processing apparatus may store information associated with the index in the memory. Based on the information, the radar signal processing apparatus may determine the index of the transmission radar signal corresponding to the verified arrival time. The radar signal processing apparatus may calculate the large scale range based on the index.

The radar signal processing apparatus may use a mixer to mix the transmission radar signal and the reception radar signal. In an example, the radar signal processing apparatus may mix the reception radar signal and the transmission radar signal corresponding to the arrival time. The transmission radar signal and the reception radar signal may be, for example, signals modulated based on the same scheme.

As an example, the transmission radar signal and the reception radar signal may be modulated based on the FMCW scheme. A radar signal obtained by mixing the transmission radar signal and the reception radar signal may have a constant frequency band. Thus, the radar signal processing apparatus may mix the transmission radar signal to each of the plurality of the reception radar signals, thereby extracting a plurality of radar signals.

In an example, the radar signal processing apparatus may estimate a beat frequency from the radar signal. The beat frequency may indicate a difference in a frequency between two signals. As an example, when the transmission radar signal and the reception radar signal are modulated based on the FMCW scheme, a frequency of the radar signal may correspond to a difference between frequencies of the transmission radar signal and the reception signal. Through this, the radar signal processing apparatus may calculate a small scale range between the target and the reception antenna by applying a frequency tracking algorithm to the beat frequency.

The radar signal processing apparatus may determine the location information on the target based on the large scale range and the small scale range. For example, the radar signal processing apparatus may consecutively transmit the plurality of transmission radar signals and apply the auto-correlation to the radar signal corresponding to two consecutive periods among the radar signals acquirable for each period of the transmission radar signal, thereby extending a detection distance of the target.

Figure 3:
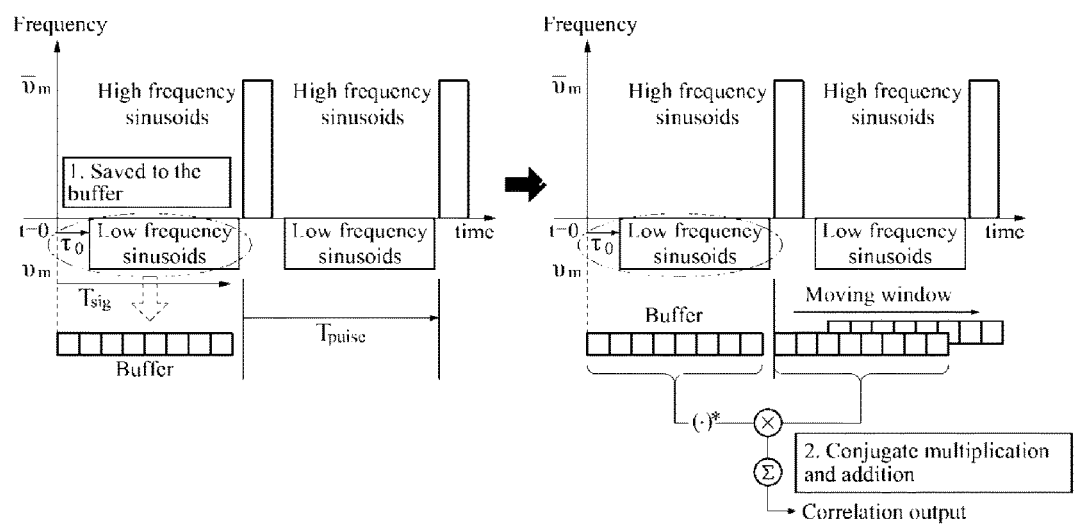
FIG. 3 is a diagram illustrating a scheme of extracting a distance between a target and a reception antenna based on a result obtained by applying an auto-correlation to a radar signal according to an example embodiment of the present invention.

FIG. 3 is a diagram illustrating a scheme of extracting a distance between a target and a reception antenna based on a result obtained by applying an auto-correlation to a radar signal according to an example embodiment of the present invention.

A radar signal processing apparatus may consecutively transmit a transmission radar signal modulated based on a FMCW scheme, and consecutively receive a reception radar signal. For example, a frequency curve of a radar signal in an interval in which a difference in a frequency between the transmission radar signal and the reception radar signal is constantly maintained may be provided in a form of low frequency sinusoids. A frequency curve of a radar signal in an interval in which a difference in a frequency between the transmission radar signal and the reception radar signal is not constantly maintained may be provided in a form of high frequency sinusoids In a left graph of FIG. 3, the radar signal processing apparatus may store, in a buffer, a transmission radar signal transmitted earlier than an arrival time of the reception radar signal. The radar signal processing apparatus may store information associated with the transmission radar signal in the buffer. The information associated with the transmission radar signal may include, for example, the index of the transmission radar signal. Thus, the radar signal processing apparatus may store the information associated with the transmission radar signal in the buffer.

Also, the radar signal processing apparatus may estimate a beat frequency based on a frequency of the transmission radar signal and a frequency of the reception radar signal. The radar signal processing apparatus may store a signal in the buffer to be in a form of low frequency sinusoids having the estimated beat frequency.

The radar signal processing apparatus may calculate a small scale range when the reception radar signal arrives before half of a period of the transmission radar signal elapses. In this example, the radar signal processing apparatus may calculate the small scale range by applying a frequency tracking algorithm to the estimated frequency of the signal stored in the buffer as a form of low frequency sinusoids.

The radar signal processing apparatus may calculate a large scale range when the reception radar signal arrives after half of the period of the transmission radar signal. The radar signal processing apparatus may obtain a peak value by applying an auto-correlation to a radar signal corresponding to two consecutive periods among radar signals acquirable for each period of the transmission radar signal, thereby verifying a point at which the reception radar signal arrives. Also, based on the obtained peak value, the radar signal processing apparatus may estimate an index of a transmission radar signal transmitted at an arrival time of the reception radar signal. Through this, the radar signal processing apparatus may calculate the large scale range based on the estimated index.

The radar signal processing apparatus may store, in the buffer, a signal having a form of low frequency sinusoids based on the reception radar signal and the transmission radar signal in consideration of the period of the transmission radar signal. To apply the auto-correlation, the radar signal processing apparatus may apply a conjugate operation to a signal having a form of low frequency sinusoids and stored in two consecutive buffers. The radar signal processing apparatus may obtain the peak value by calculating a sum of multiplication results performed on each buffer cell including the signal to which the conjugate operation is applied. The radar signal processing apparatus may estimate an index corresponding to a point in time at which the obtained peak value is present. Based on the estimated index of the transmission radar signal, the radar signal processing apparatus may extract location information on a target.

In an example, as illustrated in FIG. 3, the radar signal processing apparatus may divide the buffer to store the transmission radar signal and the reception radar signal separately. Through this, in a process of applying the auto-correlation, the radar signal processing apparatus may use a portion of the reception radar signal so as to estimate the index of the transmission radar signal through a low complexity operation.

Figure 4:
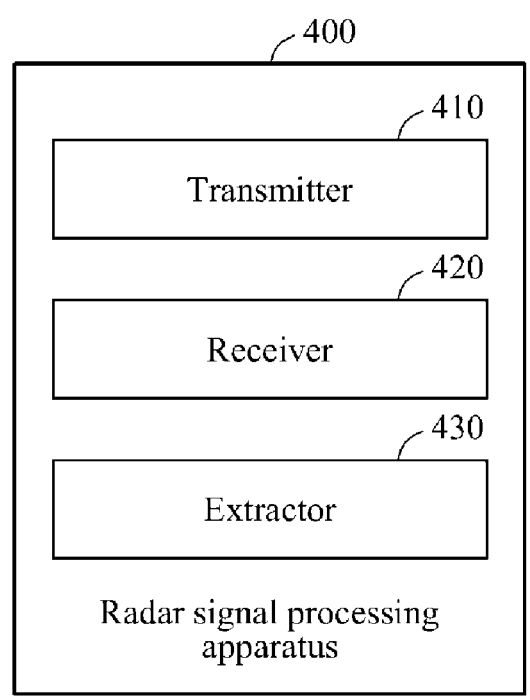
FIG. 4 is a block diagram illustrating a radar signal processing apparatus for performing a radar signal processing method of extracting a location of a target based on an index of a transmission radar signal and a result obtained by applying an auto-correlation to a radar signal according to an example embodiment of the present invention.

FIG. 4 is a block diagram illustrating a radar signal processing apparatus 400 for performing a radar signal processing method of extracting a location of a target based on an index of a transmission radar signal and a result obtained by applying an auto-correlation to a radar signal according to an example embodiment of the present invention.

The transmitter 410 may transmit a plurality of transmission radar signals through a transmission antenna. In an example, the transmitter 410 may consecutively transmit at least one transmission radar signal through the transmission antenna. The transmitter 410 may control a voltage control oscillator to generate the plurality of transmission radar signals. Through this, the transmitter 410 may consecutively transmit the plurality of transmission radar signals through the transmission antennas.

A receiver 420 may receive a reception radar signal through a reception antenna. In an example, a transmission radar signal may be reflected from a target. Thus, the receiver 420 may receive at least one concatenating reception radar signal reflected from a plurality of targets through a plurality of reception antennas for each channel.

An extractor 430 may extract location information on the target based on a result obtained by applying an auto-correlation to a radar signal corresponding to two consecutive periods among radar signals acquirable for each period of the transmission radar signal. In an example, the extractor 430 may apply the auto-correlation to the reception radar signal. The extractor 430 may verify an arrival time of the receiving radar signal based on the result obtained by applying the auto-correlation to the radar signal.

The auto-correlation may refer to, for example, a relationship between previous data and current data. The extractor 430 may verify a correlation between the transmission radar signal corresponding to the previous data and the reception radar signal corresponding to the current data, thereby verifying the arrival time. In this example, the reception radar signal may be generated based on the transmission radar signal reflected and received from the target.

In an example, the radar signal processing apparatus 400 may assign an index to the transmission radar signal. The index may refer to, for example, information associated with a transmission order of the transmission radar signal. The radar signal processing apparatus 400 may identify consecutively transmitted transmission radar signals based on the index.

The radar signal processing apparatus 400 may store information associated with the index in a memory. Based on the information, the extractor 430 may determine an index of the transmission radar signal corresponding to the verified arrival time. The extractor 430 may calculate a large scale range based on the index.

The radar signal processing apparatus 400 may use a mixer to mix the transmission radar signal and the reception radar signal. In an example, the radar signal processing apparatus 400 may mix the reception radar signal and the transmission radar signal corresponding to the arrival time. The transmission radar signal and the reception radar signal may be, for example, signals modulated based on the same scheme.

As an example, the transmission radar signal and the reception radar signal may be modulated based on an FMCW scheme. A radar signal obtained by mixing the transmission radar signal and the reception radar signal may have a constant frequency band. Thus, the radar signal processing apparatus 400 may mix the transmission radar signal to each of the plurality of the reception radar signals, thereby extracting a plurality of radar signals.

In an example, the extractor 430 may estimate a beat frequency from the radar signal. The beat frequency may indicate a difference in a frequency between two signals. As an example, when the transmission radar signal and the reception radar signal are modulated based on the FMCW scheme, a frequency of the radar signal may correspond to a difference between frequencies of the transmission radar signal and the reception signal. Through this, the extractor 430 may calculate a small scale range between the target and the reception antenna based on the beat frequency.

The extractor 430 may determine the location information on the target based on the large scale range and the small scale range. Accordingly, the radar signal processing apparatus 400 may consecutively transmit the plurality of transmission radar signals and apply the auto-correlation to a radar signal corresponding to two consecutive periods among radar signals acquirable for each period of the transmission radar signal, thereby extending a detection distance of the target.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A radar signal processing method comprising:
transmitting a plurality of transmission radar signals, including a transmission radar signal, through a transmission antenna;
receiving a reception radar signal reflected from a target in response to the transmitting;
applying an auto-correlation to the reception radar signal to obtain a result;
verifying an arrival time of the reception radar signal based on the result; and
extracting location information of the target by:
calculating a distance to the target based on a beat frequency between the transmission radar signal and the reception radar signal corresponding to the verified arrival time when no more than half a period of the transmission radar signal has elapsed at the verified arrival time; or
calculating the distance to the target based on an index of the transmission radar signal determined at the verified arrival time when more than half the period of the transmission radar signal has elapsed at the verified arrival time.

2. The method of claim 1, wherein the extracting comprises determining the index of the transmission radar signal based on the verified arrival time.

3. The method of claim 1, wherein the transmission radar signals and the reception radar signal are modulated based on a frequency modulated continuous wave (FMCW) scheme.

4. The method of claim 1, wherein the auto-correlation is applied to a radar signal corresponding to two consecutive periods among radar signals acquirable for each period of the transmission radar signal.

5. A radar signal processing apparatus comprising:
a transmitter configured to transmit a plurality of transmission radar signals, including a transmission radar signal, through a transmission antenna;
a receiver configured to receive a reception radar signal reflected from a target in response to the transmitting; and
an extractor configured to:
apply an auto-correlation to the reception radar signal to obtain a result;
verify an arrival time of the reception radar signal based on the result; and
extract location information of the target by:
calculating a distance to the target based on a beat frequency between the transmission radar signal and the reception radar signal corresponding to the verified arrival time when no more than half a period of the transmission radar signal has elapsed at the verified arrival time; or
calculating the distance to the target based on an index of the transmission radar signal determined at the verified arrival time when more than half the period of the transmission radar signal has elapsed at the verified arrival time.

6. The apparatus of claim 5, wherein the extractor is configured to determine the index of the transmission radar signal based on the verified arrival time.

7. The apparatus of claim 5, wherein the transmission radar signals and the reception radar signal are modulated based on a frequency modulated continuous wave (FMCW) scheme.

8. The apparatus of claim 5, wherein the extractor is configured to apply the auto-correlation to a radar signal corresponding to two consecutive periods among radar signals acquirable for each period of the transmission radar signal.

* * * * *